(12) United States Patent
Tamburello et al.

(10) Patent No.: US 7,529,482 B1
(45) Date of Patent: *May 5, 2009

(54) SUBBAND SPECTRUM ANALYSIS FOR OPTICAL MULTIPLEX SECTION PROTECTION

(75) Inventors: Mario Tamburello, Vimercate (IT);
Stefano Simone Turzi, Milan (IT);
Stefano Vanoli, Villa D'Adda (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/624,482

(22) Filed: Jan. 18, 2007

Related U.S. Application Data

(63) Continuation of application No. 10/261,979, filed on Sep. 30, 2002, now Pat. No. 7,181,137.

(51) Int. Cl.
*H04B 10/08* (2006.01)
*H04B 17/00* (2006.01)

(52) U.S. Cl. ............................. 398/20; 398/13; 398/17

(58) Field of Classification Search .................... 398/10, 398/11, 13, 17, 20, 28, 12, 14

See application file for complete search history.

(56) References Cited

U.S. PATENT DOCUMENTS

| | | | |
|---|---|---|---|
| 5,712,716 A | 1/1998 | Vanoli et al. | |
| 5,808,762 A | 9/1998 | Vanoli et al. | |
| 5,907,420 A | 5/1999 | Chraplyvy et al. | |
| 5,943,147 A | 8/1999 | Vanoli et al. | |
| 5,969,834 A | 10/1999 | Farber et al. | |
| 6,011,623 A | 1/2000 | MacDonald et al. | |
| 6,025,941 A | 2/2000 | Srivastava et al. | |
| 6,075,629 A | 6/2000 | Al-Salameh et al. | |
| 6,115,154 A * | 9/2000 | Antoniades et al. | 398/4 |
| 6,229,631 B1 | 5/2001 | Sato et al. | |
| 6,266,168 B1 * | 7/2001 | Denkin et al. | 398/5 |
| 6,654,561 B1 | 11/2003 | Terahara et al. | |
| 6,873,795 B1 | 3/2005 | Sugaya | |
| 6,907,197 B2 | 6/2005 | Heath et al. | |
| 6,952,529 B1 | 10/2005 | Mittal | |
| 7,113,698 B1 * | 9/2006 | Ryhorchuk et al. | 398/10 |
| 7,181,137 B1 * | 2/2007 | Tamburello et al. | 398/20 |
| 2001/0024540 A1 | 9/2001 | Ibujuro et al. | |
| 2001/0038473 A1 | 11/2001 | Li et al. | |
| 2002/0018616 A1 | 2/2002 | Li | |
| 2002/0080440 A1 | 6/2002 | Li et al. | |
| 2002/0154353 A1 | 10/2002 | Heath et al. | |
| 2002/0171889 A1 | 11/2002 | Takeuchi et al. | |
| 2003/0025956 A1 | 2/2003 | Li et al. | |

FOREIGN PATENT DOCUMENTS

WO 02/51043 6/2002

OTHER PUBLICATIONS

Richards et al., "Detecting Fiber Cuts in a WDM Ring with Optical Protection Switching: Simulation and Experiment," ECOC '98, Sep. 20-24, 1998, Madrid, Spain.

* cited by examiner

*Primary Examiner*—M. R. Sedighian

(57) ABSTRACT

The spectrum of a received WDM band or subband is analyzed to detect failure of, e.g., fiber or amplifiers along a line. In one implementation, measurements are taken within the optical spectrum at locations of expected data-carrying optical signals and at two locations just outside the wavelength range occupied by these signals. Magnitudes of adjacent measurements are compared to obtain differences. If none of the differences exceed a threshold, a fault may be determined.

7 Claims, 6 Drawing Sheets

SUBBAND SPECTRUM ANALYSIS FOR OPTICAL MULTIPLEX SECTION PROTECTION

CROSS-REFERENCE TO RELATED APPLICATIONS

The present application is a continuation of U.S. application Ser. No. 10/261,979 filed Sep. 30, 2002 and is related to the subject matter of U.S. application Ser. No. 10/139,411 filed on May 6, 2002, the contents of which are incorporated by reference herein in their entirety for all purposes.

BACKGROUND OF THE INVENTION

The present invention relates to optical communication systems and more particularly to systems and methods for handling failures in optical communication systems.

In order to accommodate increasing demands from Internet and other telecommunications traffic, optical communication links are evolving to carry higher and higher data rates over greater and greater distances. Wavelength division multiplexed (WDM) links are carrying greater numbers of more densely spaced channels on the same fiber. For example, a single optical fiber may carry 160 channels, each having a data carrying capacity of 10 Gbps, making for a total available capacity of 1.6 terabits per second. Roughly speaking, this is the information equivalent of more than 15 million simultaneous phone calls.

With such a large volume of traffic depending on the operational status of a single WDM link, assuring link reliability is of paramount importance. Various approaches have been developed. Some operate at the client layer and rely on rerouting and redundancy features associated with client layer protocols such as SONET and MPLS. Because of the large number of client layer paths to be rerouted in the event of the failure of a high-capacity WDM communication link, continued development of optical layer protection remains very important.

One optical layer approach referred to as channel protection protects optical channels individually. A redundant path is provided for each optical channel by, e.g., providing a splitter at the transmit end and a switch at the receive end. This approach is very expensive since all the protection equipment must be provided on a per-channel basis.

An alternative approach, referred to as multiplex section protection, protects all of the WDM channels as a group. The optical fiber and intermediate amplifiers of the link are duplicated. Typically, a splitter follows the final multiplexing stage at the transmit end and splits the WDM signal between the primary and backup links. A switch to select between primary and backup precedes the first demultiplexing stage of the WDM receiver system.

U.S. patent application Ser. No. 10/139,411 discloses a variant of multiplex section protection where channels are protected on a per-subband basis. Protection unit equipment is inserted between multiplexing stages at the transmit end and between demultiplexing stages at the receive end. This is here referred to as optical multiplex subband protection.

To support the optical multiplex section protection scheme and the optical subband multiplex section scheme, it is desirable to have accurate and rapid detection of failures along the link. Detection of failure should preferably be sufficiently rapid to support correction of the detected fault within 50 ms. The number of falsely detected faults should be very low, even over the course of many years of operation. The fault detection scheme should be compatible with either optical multiplex protection or optical multiplex subband protection and should be readily adapted to any band or channel plan. The protection scheme should also be compatible with the architecture of OADM sites where only a limited selection of optical channels are extracted from and inserted into the light flow.

There are various existing approaches to failure detection but they all have shortcomings when applied to optical multiplex section protection and optical subband multiplex section protection. One can check for continuity of an optical service channel used to carry maintenance information but since this channel is not typically amplified, failure of intermediate amplifiers is not typically detected.

In an approach not admitted to be prior art, one can also designate an in-band amplified channel for continuity checking but this channel may fail individually for reasons other than failure of the amplifiers or fibers carrying the protected band or subband. Furthermore, designating a particular channel for fault detection limits flexibility in modifying the channel plan to suit disparate applications.

Other approaches rely on modulation superimposed on the individual channels to overcome Brillouin scattering effects. This modulation is referred to as a Brillouin tone. One could conceivably detect this tone on a composite multichannel optical signal. However, generally speaking, this modulation is not phase synchronized among channels and does not have a calibrated amplitude. The presence of a detectable Brillouin tone in the composite signal is therefore not guaranteed. In another approach, not admitted as prior art, one could overcome these problems by phase-synchronizing and calibrating the amplitudes of the Brillouin tones. To support subband protection, one could assign a different tone frequency to each subband. These modifications to the Brillouin tone scheme would, however, come at great expense due to the necessary adaptation of transponder hardware and software.

Another approach relies on injection of a special pilot tone on the protected multi-channel signal before the first amplifier in the protected link. This requires modification of certain amplifiers and a cumbersome differentiation between "first amplifiers" and other amplifiers. Also, in any WDM system that employs optical add-drop multiplexers (OADMs), the "first amplifier" will not be the same for all channels, precluding use of this scheme.

An approach described in D. Richards, et al., "Detecting Fiber Cuts in a WDM Ring with Optical Protection Switching: Simulation and Experiment," (ECOC Proceedings September 1998) relies on comparison between a measurement of a signal received in a single marker channel added to support failure detection and measurement of a nearby "non-signal" region. The addition of the marker channel however reduces the number of channels usable to transmit data. Furthermore, the protection scheme becomes more complex when applied to optical subband multiplex section protection since each subband will require a marker channel. Also, wherever an OADM is used, the marker channel will need to be extracted and re-injected.

What is needed are systems and method for optical line failure detection that provide the needed speed, reliability, and accuracy while overcoming the drawbacks of the above-described approaches.

DETAILED DESCRIPTION OF THE INVENTION

Embodiments of the present invention will be described with reference to a WDM communication link where multiple optical signals having different wavelengths are combined onto the same fiber. There may be, e.g., dozens of WDM channels, each carrying, e.g., a 10 Gbps signal. At intermediate points along the link, there may be optical amplification to regenerate the signal without conversion to electrical form. Chromatic dispersion compensation may also be applied at intermediate points along the link.

To assure tolerance to faults, a protection WDM link is also provided. When a fault is detected the entire composite WDM signal may be shifted to the protection link. Alternatively, faults may be detected and corrected on a per-subband basis. In this way, one can offer protection only on subbands where protection is desired. It may be desirable to not offer protection on subbands carrying lower priority traffic or subbands carrying traffic that is fully protected at the client layer.

Figure 1:
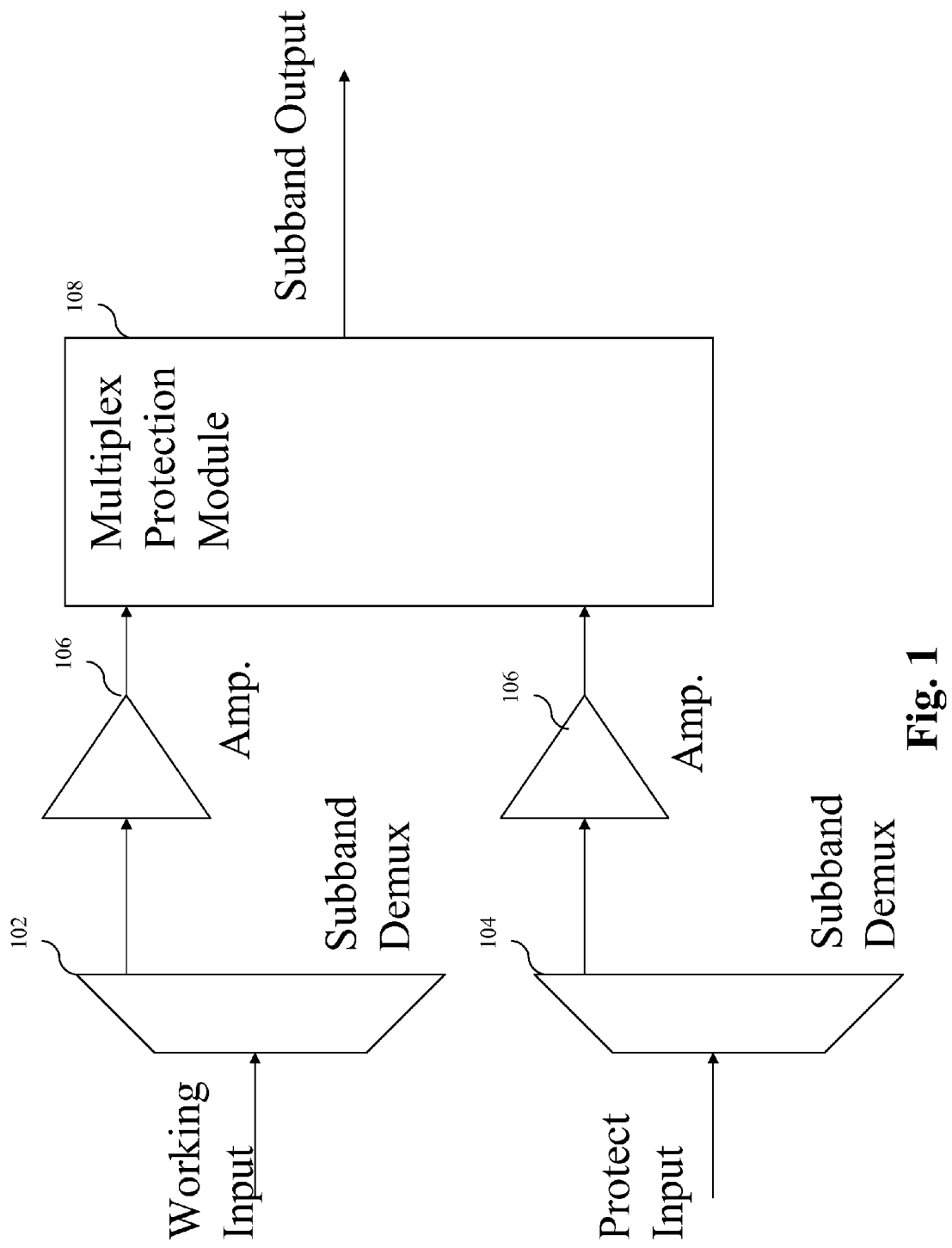
FIG. 1 depicts an optical protection scheme according to one embodiment of the present invention.

FIG. 1 depicts an optical protection scheme as would be implemented within a WDM receiver system. For clarity of description, certain components not pertinent to the present invention are omitted such as chromatic dispersion compensation, pre amplification, demodulation, etc. FIG. 1 also assumes that protection is provided on a per-subband basis but it will be understood that the present invention is not limited to this application.

In FIG. 1, a fiber from the working line (line that is protected) is input to a demultiplexer 102 while a fiber from the protection line is input to a demultiplexer 104. The composite WDM signal may include, e.g., dozens or even hundreds of individual channels. Demultiplexers 102 and 104 separate the composite signals into subbands. FIG. 1 depicts further processing for one subband. It should be noted that each subband may consist of a contiguous set of channels so that the subbands do not overlap. Alternatively, the subbands may be interleaved with one another. In FIG. 1 each subband is amplified by an amplifier 106 which may be an EDFA, Raman amplifier, or any suitable optical amplifier.

The amplified received working and protection signals for the particular subband are input to a multiplex protection module 108. Multiplex protection module 108 detects faults on the line leading to the working input and reacts to faults by switching input for the subband to the protection line. Signal will typically be available on either line. These faults may include breaks in the line, amplifier failure, etc.

Figure 2:
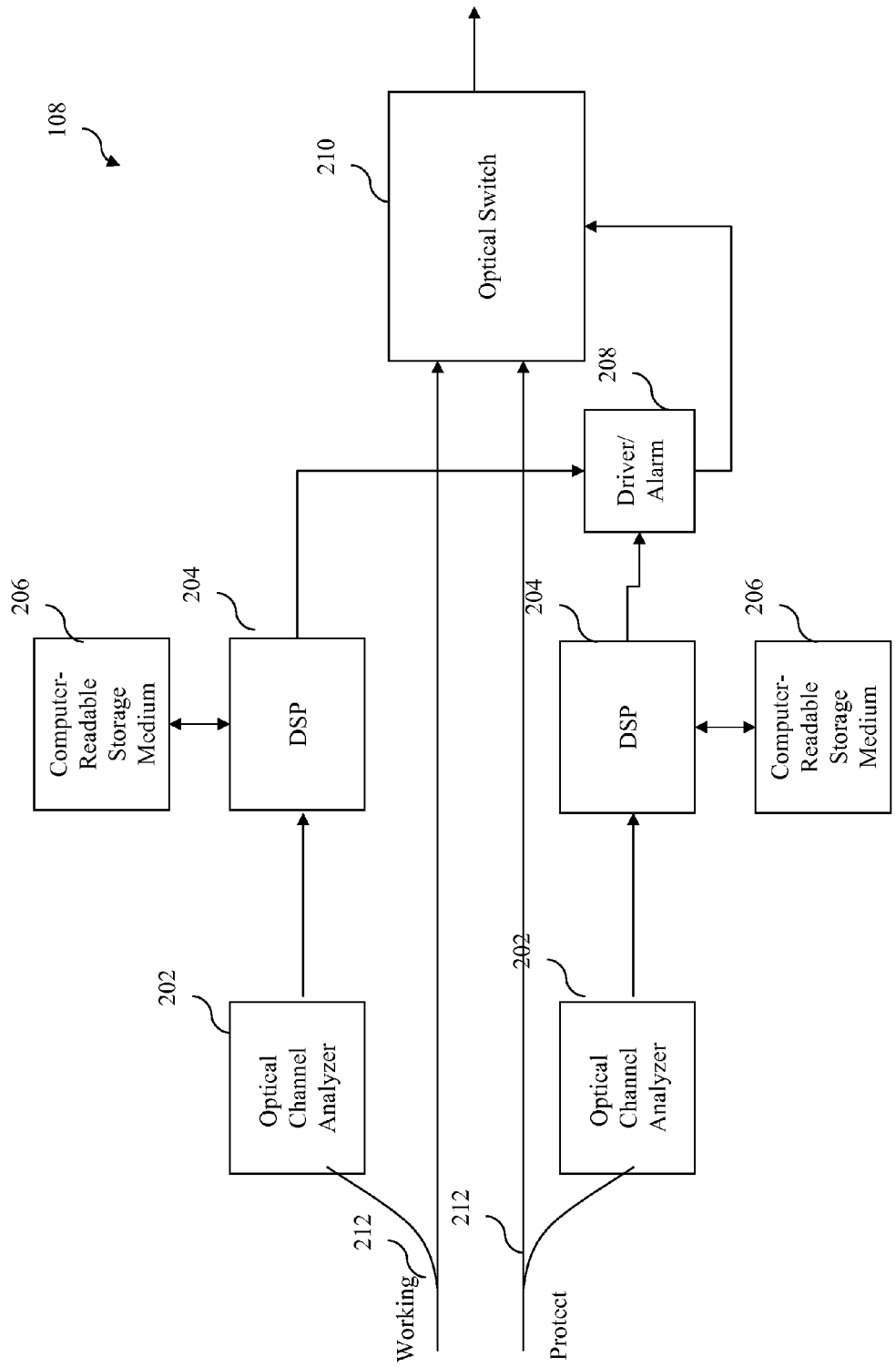
FIG. 2 depicts a multiplex protection module according to one embodiment of the present invention.

FIG. 2 depicts details of multiplex protection module 108 according to one embodiment of the present invention. For both the working and protection line, there is an optical channel analyzer 202. The optical channel analyzer gives a power spectrum for a selected range of wavelengths. Example implementations of the optical channel analyzer include the BKM-54005 available from Bookham Technologies and the Gain Equalization Monitor available from JDS Uniphase. The optical channel analyzer may be implemented in any suitable manner. The optical channel analyzer module may include an optical signal demultiplexer and a photodiode array where each photodiode detects a different portion of the received optical spectrum. There are preferably at least M+1, typically M+2 measurement channels where M is the number of signal channels in the protected band or sub-band. The optical channel analyzers are coupled to the demultiplexed subband signals by tap couplers 212 that tap off e.g., 1 to 5 percent of the optical power, for analysis to support fault detection.

Optical channel analyzers 202 forward detected signal levels to digital signal processors 204. Digital signal processors 204 may be, e.g., conventional microprocessors or specialized digital signal processing integrated circuits. Digital signal processors 204 may be implemented by hardware, software, or any suitable combination thereof. Software to implement operation of digital signal processors 204 may be stored on computer-readable storage mediums 206. Computer-readable storage mediums 206 may be RAMs, ROMs, or any suitable kind of memory device or storage device. Software instructions for implementing aspects of the present invention may also be stored on computer-readable storage media such as, e.g., floppy disks, CD-ROMs, DVD-ROMs, or a signal transmitted over a network.

As will be explained below, digital signal processors 204 perform operations on the data output by optical channel analyzers 202 and determine whether a fault has occurred. Fault indications are transmitted to a driver/alarm 208 which can notify a system operator of the fault either visually or aurally. Driver/alarm 208 also directs the operation of an optical switch 210 to select between the working line and protection line.

Figure 3:
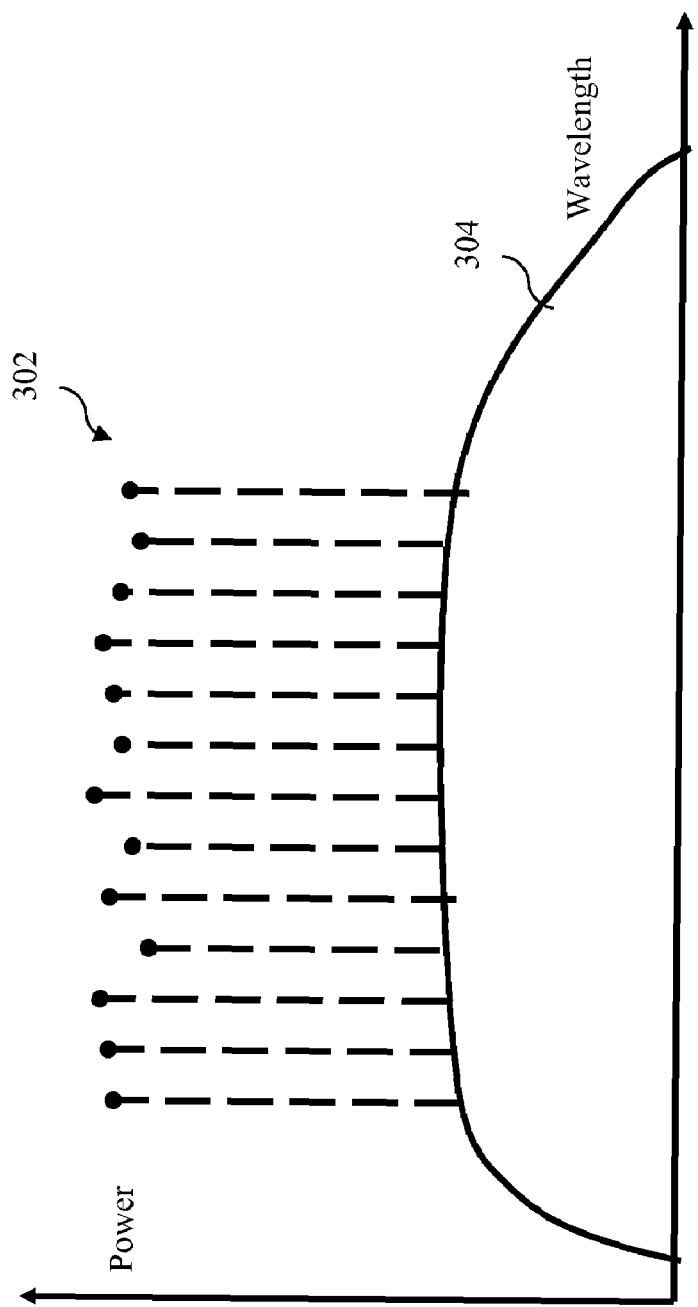
FIG. 3 depicts a spectrum of a received multi-channel signal according to one embodiment of the present invention.

FIG. 3 depicts a spectrum of a received multi-channel signal according to one embodiment of the present invention. This can be a single sub-band as would be analyzed by optical channel analyzers 202 in FIG. 2. The dotted lines 302 correspond to received data-carrying optical signals. The received channels do not have identical amplitude due to differences in transmitted power and spectral shaping caused by amplifiers and fiber. There is also a broadband noise floor 304 resulting from amplifier spontaneous emission (ASE). The shaping of the ASE caused by multiplexers 102 and 104 is not shown. The number of channels shown has been selected for ease of depiction.

Figure 4:
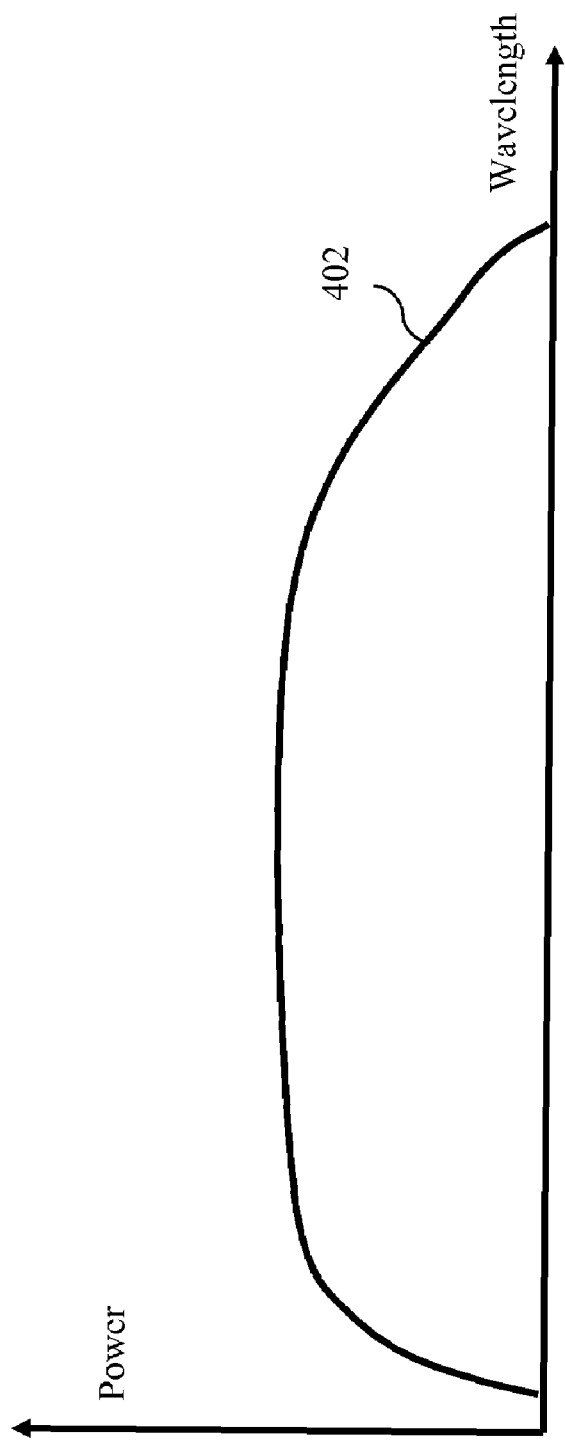
FIG. 4 depicts a spectrum of amplifier spontaneous emission (ASE) in the absence of a signal according to one embodiment of the present invention.

After a failure of the subband due to, e.g., an amplifier failure or a fiber cut, only the ASE will be received. FIG. 4 depicts a spectrum of ASE 402 in the absence of a signal according to one embodiment of the present invention. Since the amplifiers typically operate at constant output power, after a short transient the total power output by the line returns to the same level as in the operational state but with a different spectral shape. After a longer time period, on the order of hundreds of milliseconds, the amplifiers along the line could automatically shut down for safety reasons causing the received spectrum to disappear entirely.

A fault detection scheme according to one embodiment of the present invention relies on detecting the loss of the spectral peaks corresponding to the WDM channels. This can be done by establishing measurement channels within optical channel analyzers 202 for each WDM signal channel and for an additional two channels where only ASE is expected and no data-carrying signal. Digital signal processors 204 monitor the magnitudes within the measurement channels and compute differences between adjacent channels. When all the channels have the same magnitude, this indicates a line fault. If at least one measurement channel has a magnitude difference compared to its neighbor, it is assumed that there is no line fault.

Figure 5:
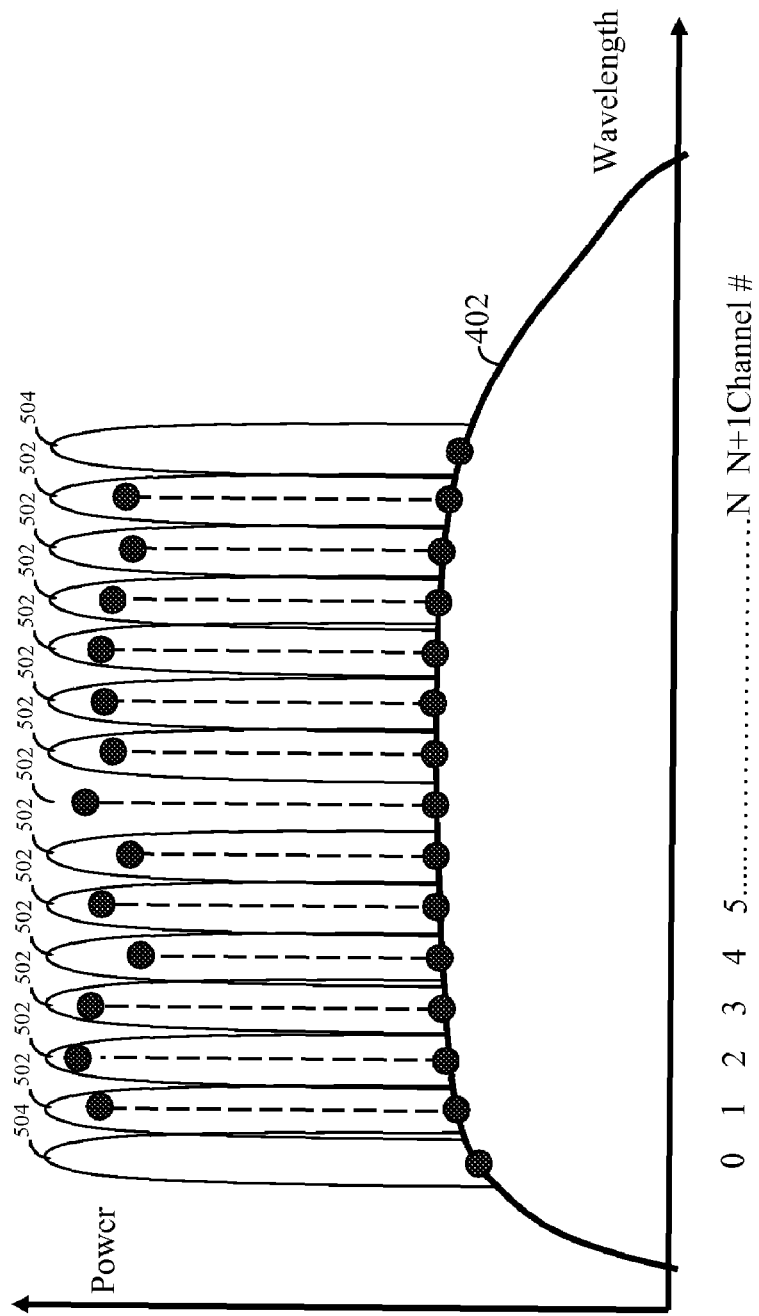
FIG. 5 depicts measurements made on a spectrum of a received multi-channel signal according to one embodiment of the present invention.

FIG. 5 depicts measurements made on a spectrum of a received multi-channel signal according to one embodiment of the present invention. Measurement channels 1 through N (502) correspond to data-carrying optical signals. Measurement channels 0 and N+1 (504) are positioned where only ASE noise is expected. The power levels in measurement channels 1 through N will be high in comparison with power levels in measurement channels 0 and N+1 when there is no fault. The power levels in measurement channels 1 through N will be close to power levels in measurement channels 0 and N+1 when there is a fault.

Figure 6:
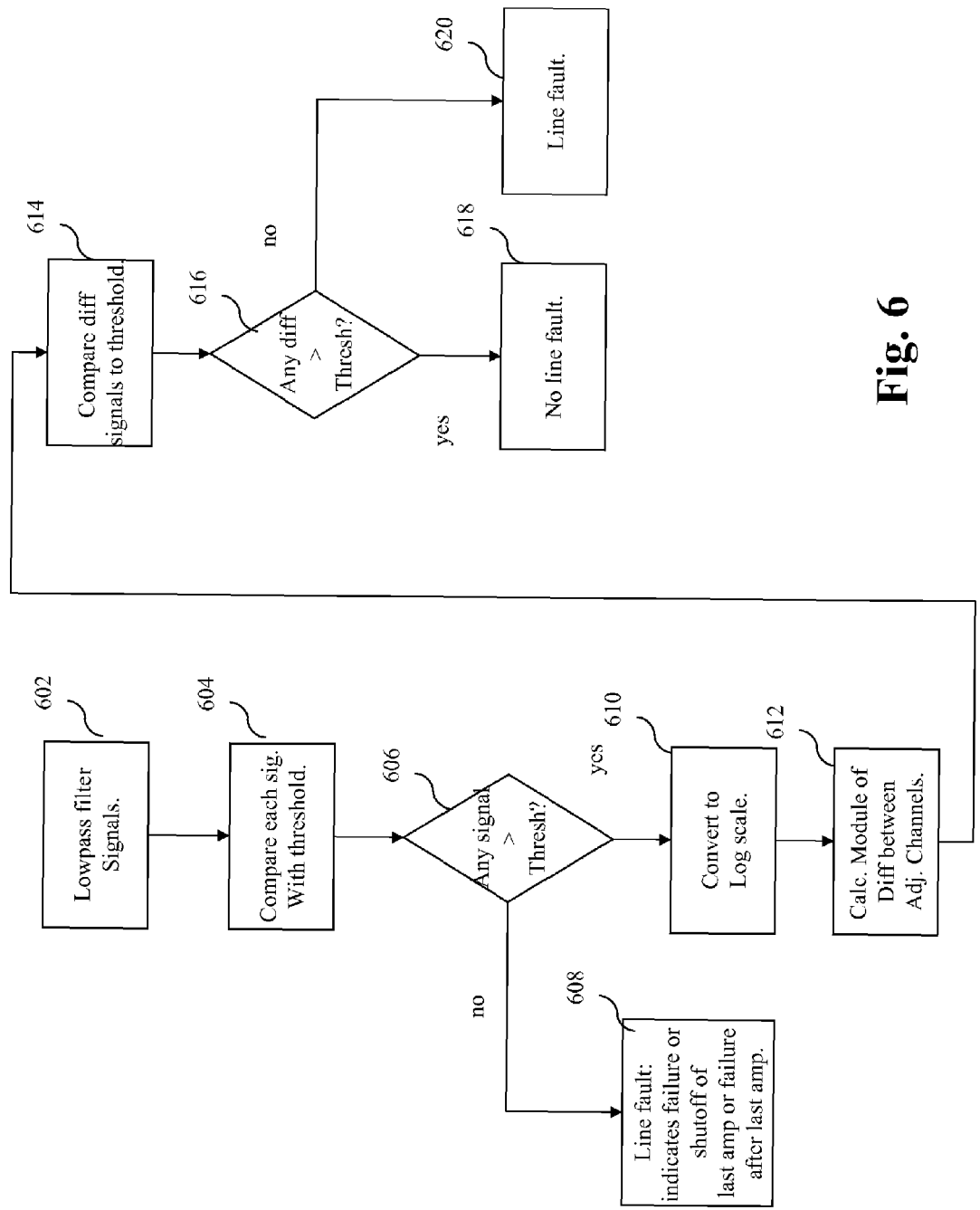
FIG. 6 is a flowchart describing steps of testing for a line fault according to one embodiment of the present invention.

FIG. 6 is a flowchart describing steps of testing for a line fault according to one embodiment of the present invention. The steps of FIG. 6 may be performed by, e.g., digital signal processors 204. The steps are described with reference to a single digital signal processor 204 associated with the working line. At step 602, the measurement channel magnitudes measured by optical channel analyzers 202 are low pass filtered with a time constant $\tau$. Generally, $\tau$ should be selected to integrate as many bit periods of the modulation data as possible while allowing for rapid fault detection to support accomplishing the entire protection operation in 50 ms. In one embodiment, $\tau$ is on the order of 1-10 milliseconds. At step 604, the filtered magnitude in each measurement channel is compared with a threshold, A. The A threshold should be fixed between the minimum expected received power level under all conditions and the noise floor of the optical channel analyzer. A step 606 tests whether any of the filtered magnitudes is greater than A. If none of the filtered magnitudes is greater than A, processing proceeds to a step 608 where driver/alarm 208 notifies the operator of the complete loss of signal energy. This is indicative of a failure such as shut-off at the last amplifier, e.g., amplifier 106, or later in the chain leading up to optical channel analyzer 202. Driver/alarm 208 can then notify the operator and rapidly switch to the other line.

If step 606 determines that any of the signals is greater than a threshold, then processing proceeds to a step 610 where the filtered magnitudes are converted to a logarithmic scale. A step 612 then computes the differences between the log magnitudes for adjacent channels: $D_n = |L_n - L_{n-1}|$ for n=1 to N+1. A step 614 compares these difference signals to a threshold, E. The E threshold should be fixed between the minimum optical signal to noise ratio (OSNR) on the received data-carrying signals and the maximum expected difference signal between adjacent measurement channels on the ASE spectrum. A typical value of OSNR is higher than, e.g., 8 dB. A typical value for E is, e.g., 3 dB. A step 616 tests whether any of the differences are above the threshold, E. If any are above E, a step 618 determines that there is no fault. If all are below E, a step 620 determines that there is a fault. Driver/alarm 208 can then notify the operator and rapidly switch to the other line.

If the working fiber is currently selected and continuity is lost, reception shifts to the protection fiber if continuity is detected there. If continuity of the working fiber resumes after a shift to the protect line, the operator is notified and may shift to the working fiber when desired or this may happen automatically, especially if continuity of the protection fiber is lost. The switching criteria are thus based on measurements made on both the working fiber and the protection fiber.

The steps of FIG. 6 may be repeated, e.g., every 10 milliseconds. The comparisons of step 606 and 616 should incorporate hysteresis to reduce frequent on-off toggling of the alarm condition when near the threshold.

The above-described technique achieves extremely high accuracy in detecting faults with a very low incidence of false detection. Detection and switching can be accomplished in less than 50 milliseconds. The fault detection and switching operations can be performed on either an entire WDM band or a subband. There is no required configuration or spacing of channels. The above-described technique is compatible with OADM operation.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, criteria for determining a fault may be stricter or more relaxed than described above.

The invention claimed is:

1. Apparatus for detecting an optical communications fault, said apparatus comprising:
   an optical signal analyzer that extracts received signal magnitudes in a plurality of measurement channels including at least one measurement channel corresponding to a wavelength of a data-carrying optical signal and at least one measurement channel corresponding to a wavelength where no data-carrying optical signal is expected; and
   a processor that low-pass filters said signal magnitudes with a time constant $\tau$ selected to integrate a selected plurality of bit periods of the modulation data during each of a plurality of selected time periods, and determines whether a line fault has occurred by computing a difference signal of the magnitudes for at least a pair of adjacent channels and comparing said difference signal to a selected threshold.

2. The apparatus of claim 1 wherein said processor compares received signal magnitudes of adjacent ones of said plurality of measurement channels.

3. The apparatus of claim 2 wherein said processor determines that a line fault has occurred if no difference between magnitudes of received signals exceeds said threshold.

4. The apparatus of claim 1 wherein said plurality of measurement channels comprises:
   a first group of measurement channels corresponding to data-carrying channels of a WDM communication link;
   a first amplifier spontaneous emission (ASE) measurement channel below said first group; and
   a second ASE measurement channel above said first group, no data-carrying optical signal being expected in said first and second ASE measurement channels.

5. The apparatus of claim 4 wherein said data-carrying communication channels occupy only a subband of spectrum utilized by said WDM communication link for data communication.

6. The apparatus of claim 4 wherein said data-carrying communication channels constitute all data-carrying communication channels utilized by said WDM communication link.

7. The apparatus of claim 1 wherein said selected threshold is greater than the optical signal to noise ratio (OSNR) on the received data-carrying signals and the maximum expected difference signal between adjacent measurement channels on an_amplifier spontaneous emission (ASE) spectrum.

* * * * *